J. SODERQUIST.
TIRE ARMOR.
APPLICATION FILED OCT. 23, 1917.

1,259,308.

Patented Mar. 12, 1918.

J. Soderquist
Inventor

By Geo. P. Kimmel
Attorney

UNITED STATES PATENT OFFICE.

JOHN SODERQUIST, OF BELOIT, WISCONSIN.

TIRE-ARMOR.

1,259,308.  Specification of Letters Patent.  Patented Mar. 12, 1918.

Application filed October 23, 1917. Serial No. 198,049.

*To all whom it may concern:*

Be it known that I, JOHN SODERQUIST, a citizen of the United States, residing at Beloit, in the county of Rock and State of Wisconsin, have invented certain new and useful Improvements in Tire-Armor, of which the following is a specification.

This invention relates to tires and has more especial reference to an improved armor therefor.

The invention has for its dominant object to provide an external armor for pneumatic tires, whereby puncturing of the same will be prevented and also, the wearing of the tread portion thereof eliminated during travel over a roadway or other surface.

Another and equally important object of the invention is to provide an armor for tires having means arranged on the tread thereof to positively prevent skidding of the vehicle.

Yet another object of the invention is to provide a tire armor capable of expansion, thus permitting the same to automatically adjust itself over the tread portion of a tire upon inflation and further, to enable the placing of the armor upon an inflated tire.

The improvements in the details and arrangement of parts will be apparent from an inspection of the accompanying drawings, in connection with the specific description hereinafter contained, and wherein the preferred embodiment of the invention is disclosed for the purpose of imparting a full understanding of the same.

In the drawings:—

Figure 1:
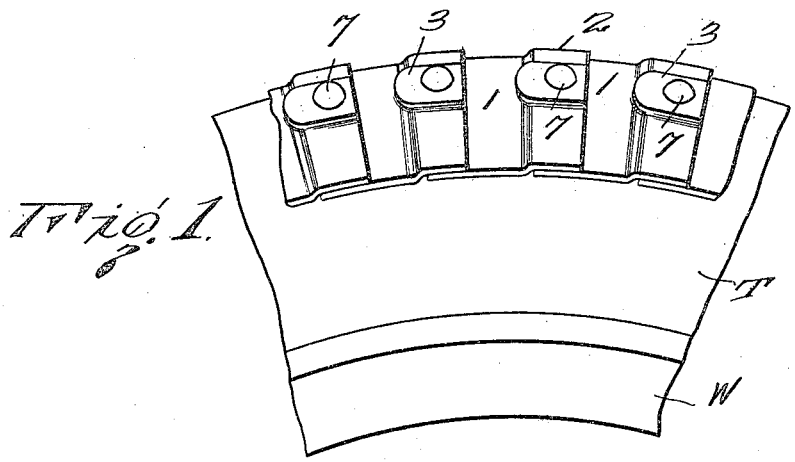
Figure 1 is a fragmental side elevation of the armor applied.
Figure 2:
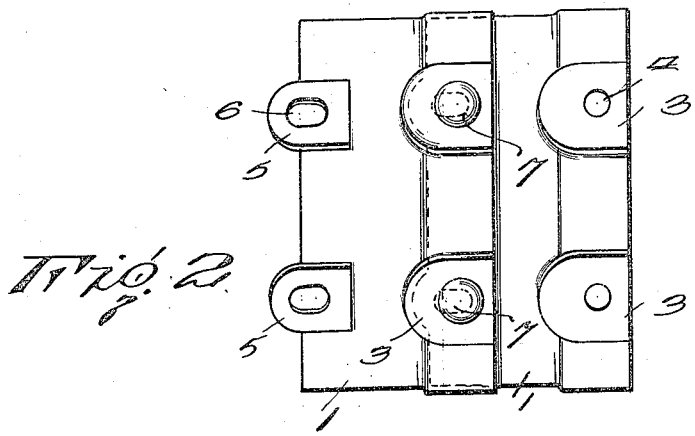
Fig. 2 is a plan of a portion thereof.
Figure 3:
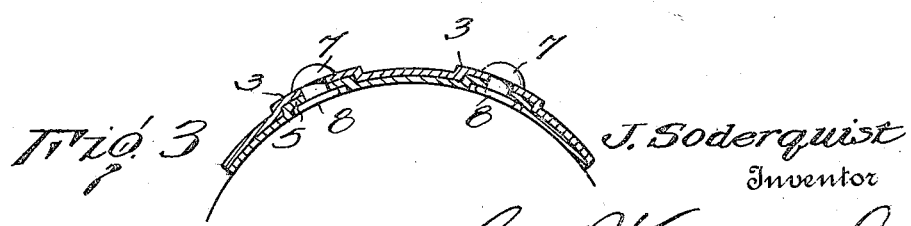
Fig. 3 is a vertical transverse section therethrough.

Having more particular reference to the drawings and in connection with which like reference characters will refer to the corresponding parts throughout the several views, W represents a vehicle wheel in its entirety having a pneumatic tire T arranged thereabout to which my improved tire armor, hereinafter described, is applied.

The tire armor is composed of a plurality of segmental tread elements generally indicated by the numeral 1, these tread elements being substantially arcuate in cross section and adapted to be arranged over the tread portion of the tire T. The elements 1 may be and preferably are formed from metal, such as steel or the like and have seats or offset portions 2 formed in certain of the ends thereof, the said offset portions, in turn, having depressions 3 formed therein and having openings 4 passing through the same, the purpose of which will be subsequently apparent.

Ears 5 are formed upon the remaining ends of the elements 1 and have portions of the same projecting slightly beyond the margins thereof, it being noted in this connection, that the said ears are slotted as at 6. In forming the seats 3 and the ears 5 upon the segmental elements 1, the process is preferably accomplished by dies or like devices. Further, the seats 3 are of a size and shape to permit the arranging of the ears 5 therein when the elements are arranged about the tread portion of the pneumatic tire T.

In assembling the segmental elements, the offset portions 2 serve to receive the adjacent ends of the following elements therein; the ears 5, obviously, seating in the seats 3 formed therein, thereby affording an overlapping jointure between each of the segmental elements 1. Rivets or like fastening devices 7 are passed through the openings 4 and the slots 6 and have the inner extremities thereof upset or swaged as at 8 for an obvious purpose. Due to the manner in which the segmental elements 1 are connected, it will be readily understood that relative longitudinal movement of the same is permitted and as a consequence, expansion of the tire armor as a whole is allowed. Thus, when the same is arranged over the tread portion of a tire and the tire is subsequently inflated, the armor will be permitted to properly adjust itself thereover. It will be also understood, that by expanding the armor and flexing the same slightly, the same may be arranged over the tread portion of an inflated tire.

When in position upon a pneumatic tire, my improved armor will snugly engage the same and as a consequence, will prevent movement of the same with relation to the tire T.

The armor not only serves as a means for protecting the tire and preventing material wear thereof, but also, as an efficient non-skid means therefor, the rounded head of the rivets serving to positively engage the surface of a roadway or the like to prevent skidding of the vehicle. Further, the device when arranged upon the driving wheels of motor vehicles will serve as means for affording positive connection between the tires of the wheels and the surface of the roadway, since, as above stated, relative movement of the armor and tire is prevented.

Manifestly, the construction shown is capable of considerable modification and such modification as is within the scope of my claims, I consider within the spirit of my invention.

I claim:—

1. A tire armor, including a plurality of segmental elements having seats and ears formed on the opposite ends of the same, said seats and ears being engaged in sequential order, and means for connecting the ears to the seats.

2. A tire armor, including a plurality of segmental elements having depressions and slotted ears formed on the opposite ends of the same, said ears and depressions being engaged in sequential order, and means passing through the slotted ears and depressions for connecting the same and permitting slight relative movement of the elements.

3. A tire armor, including a plurality of segmental elements having offset extremities, depressions formed in said offset extremities, slotted ears formed in the remaining extremities of the elements, said ears being engaged in the depressions in sequential order and having the adjacent ends of the elements arranged in the adjacent offset extremities of the same, and means for connecting the ears to said elements to permit slight relative movement of the same.

In testimony whereof, I affix my signature hereto.

JOHN SODERQUIST.

Copies of this patent may be obtained for five cents each, by addressing the "Commissioner of Patents, Washington, D. C."